(12) United States Patent
McKee

(10) Patent No.: US 6,453,023 B1
(45) Date of Patent: Sep. 17, 2002

(54) VOICE MAIL INTERVENTION

(75) Inventor: Stephan W. McKee, Anaheim, CA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/220,965

(22) Filed: Dec. 23, 1998

(51) Int. Cl.[7] .................................................. H04M 1/64
(52) U.S. Cl. ............................. 379/88.25; 379/207.07; 379/211.03; 379/221.01
(58) Field of Search ............................ 379/32.01, 32.04, 379/70, 88.522–88.25, 202.01, 203.01, 204.01, 205.01, 207.01, 207.02, 207.04–207.09, 207.16, 211.01–211.03, 214.01, 219, 220.01, 221.08, 221.01; 455/417

(56) References Cited

U.S. PATENT DOCUMENTS

| | | | |
|---|---|---|---|
| 5,416,836 A | | 5/1995 | Marinelli et al. |
| 5,471,519 A | * | 11/1995 | Howe et al. ............ 379/211.02 |
| 5,546,442 A | * | 8/1996 | Foladare et al. ............ 455/417 |
| 5,651,054 A | * | 7/1997 | Dunn et al. ............... 379/88.11 |
| 5,668,853 A | | 9/1997 | Florence et al. |
| 5,835,573 A | * | 11/1998 | Dee et al. ................. 379/88.26 |
| 5,960,064 A | * | 9/1999 | Foladare et al. .......... 379/88.26 |
| 6,031,896 A | * | 2/2000 | Gardell et al. ............ 379/88.17 |

FOREIGN PATENT DOCUMENTS

EP  0 689 333 A2  12/1995

* cited by examiner

Primary Examiner—Fan Tsang
Assistant Examiner—Roland G. Foster
(74) Attorney, Agent, or Firm—Jenkens & Gilchrist, P.C.

(57) ABSTRACT

A system, method, and apparatus for retrieving a telephone call that has been diverted from an originally called user telephone to an alternative destination, such as a voice mail system or another user telephone. An incoming call directed toward the called user telephone is received at an exchange. The exchange routes the call to the called user telephone and monitors the call to determine if the called user telephone answers the call within a predetermined period. If not, the exchange reroutes the call to the alternative destination. Subsequently, a request is received to retrieve the rerouted call for connection with the originally called user telephone. In response, the exchange connects the call with the originally called user telephone.

41 Claims, 3 Drawing Sheets

VOICE MAIL INTERVENTION

BACKGROUND OF THE INVENTION

1. Technical Field of the Invention

The present invention relates to a method, system, and apparatus for controlling the routing of calls in a telecommunications exchange, and in particular for retrieving an incoming call that has been diverted to voice mail.

2. Description of Related Art

Voice mail is one of the most widely used telecommunications services. In a typical telecommunications network, such as a Public Switched Telephone Network (PSTN), switching functions are performed in an exchange that provides connections between particular subscribers and the rest of the telecommunications network. One of the features that is typically offered to such subscribers is personalized voice mail. Thus, instead of relying upon a home answering machine, a subscriber to the network can subscribe to a voice mail service that is provided at a public exchange of the network.

Furthermore, with the exception of some small organizations, most businesses, government agencies, education institutions, and other sizeable organizations require access to a large number of telephone lines. Instead of obtaining such access using a large number of telephone lines each having a direct connection with a PSTN, such organizations typically use a Private Branch Exchange (PBX). Use of a PBX can provide more efficient access to multiple telephone lines and allows for local, centralized control of telecommunications services. In addition, a PBX generally provides numerous features and services that can be tailored to the needs of each particular organization. A typical PBX, for example, is connected to a voice mail system and provides for the necessary processing and switching to support voice mail services.

Ordinarily, a call placed to a user's telephone that has a voice mail service will ring a few times. If there is no answer within a specified number of rings, the public exchange or PBX will divert or forward the call to a voice mailbox in the voice mail system that is associated with the user's telephone. The caller then hears a greeting and is prompted to leave a message. If a message is received, the user's telephone or voice mailbox is updated to provide an indication that a voice mail message has been left.

Occasionally, the user is temporarily away from his or her telephone or work area but returns in time to hear the last ring or two before the call is diverted to the voice mailbox. Once the call is diverted, however, the user must wait for the caller to leave a message, call the voice mail system to check the message, erase the message, and then return the call if necessary. The extra time and effort required by these circumstances can often be inconvenient and frustrating, particularly if the caller is unavailable by the time the user is able to return the call. Moreover, in some cases, the caller does not leave a message, and thus, the user is unable to determine the identity of the caller.

There is a need, therefore, for a system, method, and apparatus for retrieving a call that has already been diverted by the public exchange or PBX to the user's voice mail. Such a system, method, and apparatus would allow users to avoid the delay and inconvenience caused by having to wait for a caller to leave a message, listen to the message, and then attempt to return the call. Furthermore, such a system, method, and apparatus would help avoid the situation where the caller is unavailable to answer a returned call and would reduce the likelihood that the user will be unable to determine whose call he narrowly missed.

SUMMARY OF THE INVENTION

The present invention comprises a system, method, and apparatus for retrieving a telephone call that has been diverted by a telecommunications exchange from a called user telephone to a voice mail system or to some other destination. Generally, a telecommunications exchange includes a switching matrix for routing calls and a central computer for controlling the switching matrix and for controlling the features and services of the exchange. An incoming call, which is directed toward a particular user station, is received at a telecommunications exchange that serves the user station. In response, the central computer directs the switching matrix to route the call to a line associated with the user station, thereby causing the user station to ring.

If the call is not answered before the occurrence of some triggering event, such as the elapse of a predetermined period of time, the central computer directs the switching matrix to reroute the call to an alternative destination. When this rerouting occurs, the original connection to the user station is dropped. Typically, the alternative destination is a voice mail system, and a voice path is established between the incoming call and a voice mailbox that is associated with the particular user station. Subsequently, a request is received from the user station to retrieve the rerouted call from the alternative destination. In response to this request, the central computer directs the switching matrix to route the call, once again, to the user station. The connection with the alternative destination is dropped, and a voice path is established between the incoming call and the user station.

In a preferred embodiment of the invention, the central computer includes a called line block containing the software unit that handles the user station and a call monitor block containing the software unit that handles the incoming call. When the call is rerouted, the called line block stores a pointer to the call monitor block. Then, when the call retrieve request is received, the called line block contacts the call monitor block using the stored pointer and requests that the call monitor block reconnect the call with the user station. The call monitor block responds by directing the switching matrix to once again route the call to the user station.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
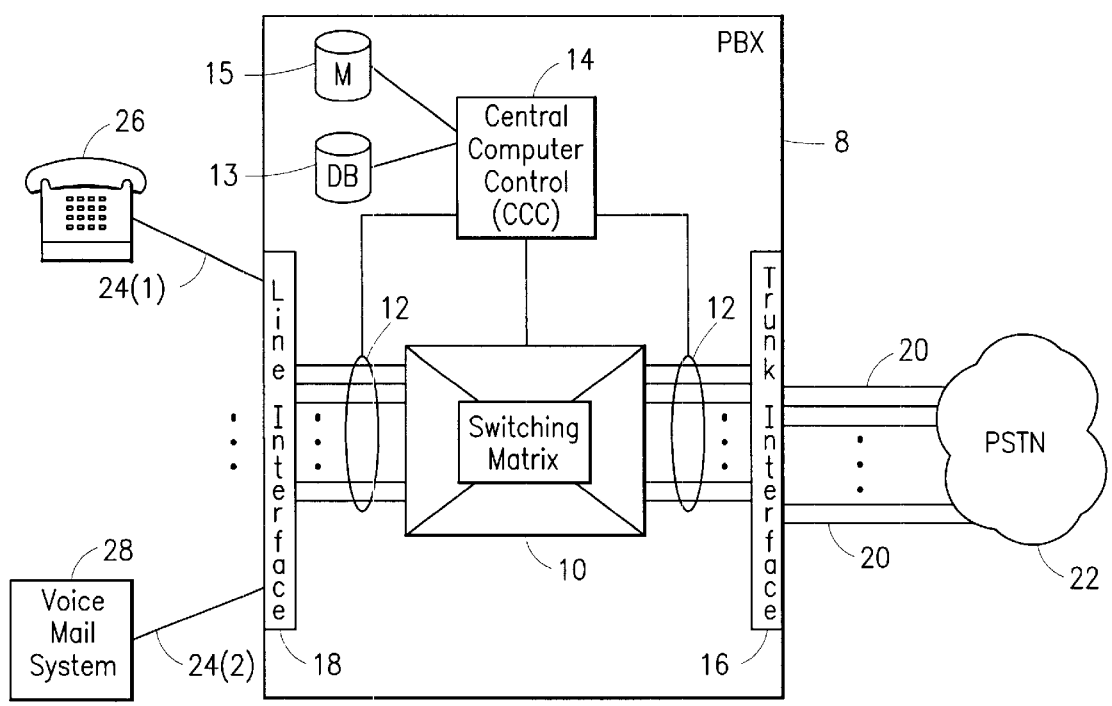
FIG. 1 is a prior art telecommunications exchange.

Referring to FIG. 1, there is depicted a prior art telecommunications exchange 8. In the preferred embodiment the exchange 8 is a Private Branch Exchange (PBX) although it will be appreciated by those skilled in the art that other types of exchanges, including public exchanges, perform analogous functions and have similar constructions. The PBX 8 includes a switch matrix 10 that provides electrical paths between input and output signal interfaces. An incoming call typically arrives at the PBX 8 from one or more exchanges of a public switched telephone network (PSTN) 22 over a trunk connection 20 (or from a user station 26 over a telephone line 24 connected to the PBX 8). In addition to or instead of being connected to a PSTN 22, the trunk connection 20 might also connect the PBX 8 to another PBX 8 or to other types of exchanges. The trunk connection 20 terminates at a trunk interface 16 of the PBX 8, which connects the call with the switch matrix 10. The switch matrix 10 routes the call to an appropriate telephone line 24 via a line interface 18. The telephone line 24 provides a connection between the PBX 8 and a user telephone 26 or other telecommunications device, such as a facsimile machine (not shown) or a voice mail system 28. Similarly, in a public exchange 8, the switch matrix 10 generally routes calls to individual subscriber lines 24 via the line interface 18.

Connections through the switch matrix 10 as well as many of the features and services provided by the exchange 8 are controlled by a central computer 14. In modern exchanges, most of the switching control functions and the features and services of the exchange 8 are implemented in software contained in the central computer 14. The use of software for performing most of the functions of the exchange 8 is less expensive than using a hardware implementation and provides for greater flexibility in the modification or addition of features to the exchange 8. The central computer 14 is linked to a database (DB) 13 that stores applications software (i.e., for controlling the features and services of the exchange 8) and a memory 15 that temporarily stores information during call processing. In addition, the central computer 14 monitors the various input and output signal conditions for lines 24 and trunk connections 20 using scanners 12 that are contained within the PBX 8.

One of the most common features associated with a typical PBX 8 is an automated voice mail system 28. An application for supporting voice mail services is stored in the database 13. When an incoming call is received at the exchange 8, via a trunk connection 20 or from a line 24 connected to the exchange 8, the call is routed to the called user telephone 26 over its corresponding line 24(1), thereby causing the user telephone 26 to ring. The central computer 14 then monitors the called line 24(1) to detect if the call is answered. If no answer is detected after a predetermined number of rings or length of time, the central computer 14, in accordance with the voice mail application, directs the switch matrix 10 to route the call to the voice mail system 28 over its corresponding line 24(2). The switch matrix 10 is also directed to release the user line 24(1). The voice mail system 28 then plays a pre-stored greeting associated with the called user telephone 26, and the caller is prompted to leave a message.

Figure 2:
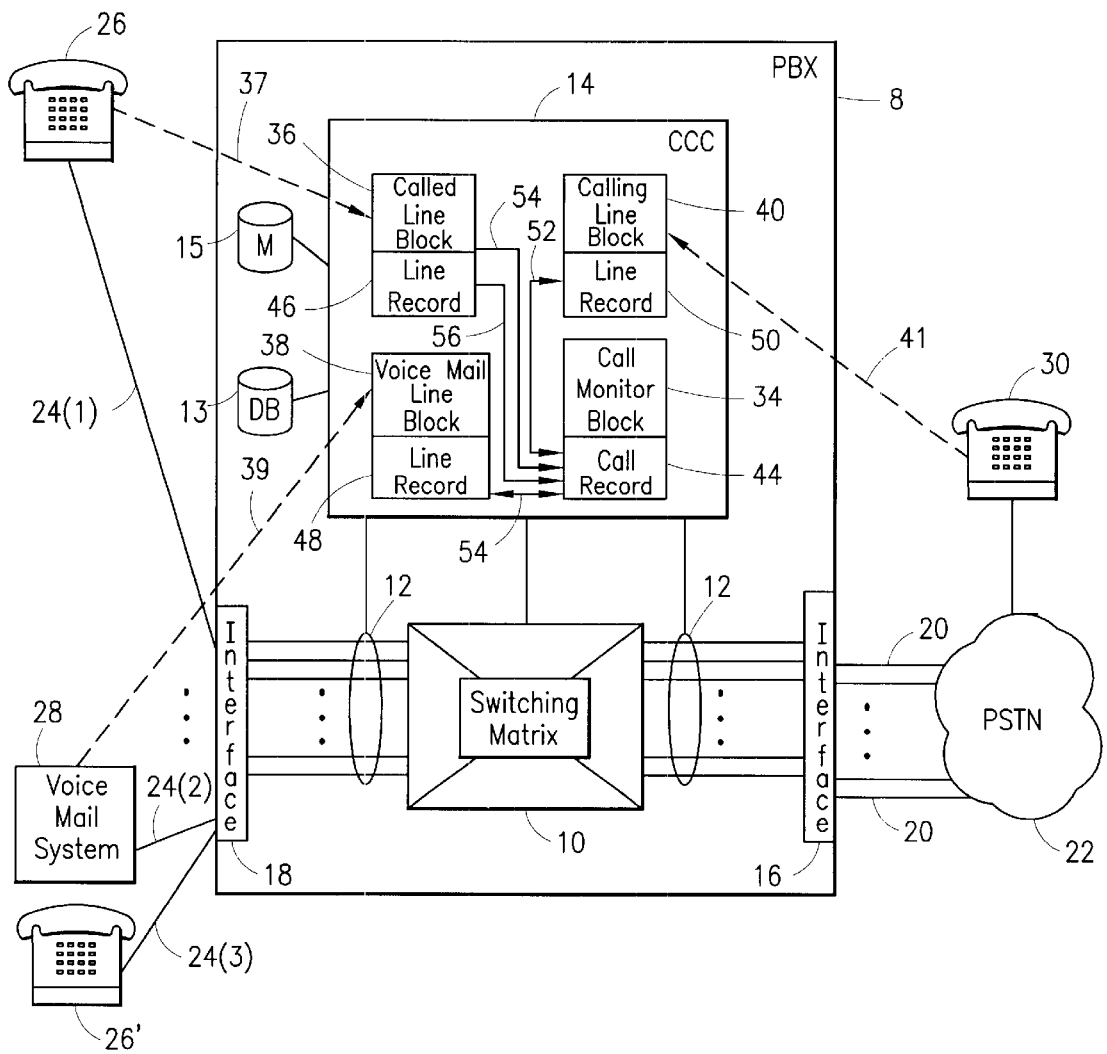
FIG. 2 is a functional block diagram of an exchange in accordance with the present invention.

Referring now to FIG. 2, there is illustrated a functional block diagram of an exchange 8 that has been modified in accordance with the present invention. As with FIG. 1, although a PBX 8 is illustrated, it will be understood that the invention is also applicable to other types of exchanges 8. First, a call is received at the exchange 8 from an external caller 30 via the PSTN 22 or from another user's telephone 26' connected to the exchange 8. The central computer 14 directs the switching matrix 10 to route the call to the user telephone 26 of the called party. In performing this function, the central computer 14 retrieves certain applications software from the database 13.

In particular, a caller line block 40 (the software unit for handling the trunk connection 20 (or telephone line 24) for the incoming call) is retrieved. The caller line block 40 includes a caller line record 50, which can be maintained in the memory 15, that temporarily stores data about the incoming trunk connection 20 or line 24 for the incoming call. Although the caller line block 40 is illustrated as being associated (as shown at 41) directly with the external caller 30, the caller line block 40 is generally used for handling the trunk connection 20 (or line 24) for the incoming call rather than the actual external telephone unit 30. In addition, the caller line record 50 can further include an identification of the calling party, if available. The central computer 14 also retrieves a call monitor block 34 (the software unit that handles the individual call). The call monitor block 34 includes a call record 44, which can be maintained in the memory 15, that temporarily stores data about the particular call.

Initially, when the incoming call is routed to the user telephone 26 of the called party, the central computer 14 further retrieves a called party line block 36 (the software unit that handles the user telephone 26 or the corresponding line 24(1)). In contrast to the call monitor block 34, which is associated with the specific call, the called line block 36 is associated with the user telephone 26 (as indicated at 37) or the corresponding line 24(1). The called line block 36 cooperates with the call monitor block 34 to perform the necessary call processing. As with the caller line block 40, the called line block 36 includes a called line record 46, which can be maintained in the memory 15, that temporarily stores data about the user telephone 26 or the corresponding line 24(1).

Routing the call to the called line 24(1) causes the user telephone to ring, and the call monitor block 34 monitors the call to determine if the call is answered. If the call is answered, then a voice path is established between the calling party telephone 30 or 26' and the called user telephone 26 via the exchange 8, and the call is processed according to normal call processing procedures. If, on the other hand, no answer is detected by the call monitor block 34 prior to a preselected triggering condition (e.g., if the call is not answered within a predetermined number of rings), the central computer 14 directs the switching matrix 10 to reroute the call to the voice mail system 28 over its corresponding line 24(2), and a voice path between the calling party telephone 30 or 26' and the voice mail system 28 via the exchange 8. At approximately the same time, the original signaling connection to the called party line 24(1) is dropped. The call monitor block 34 then cooperates with a voice mail line block 38 associated with either the voice mail system 28 (as indicated at 39) or its corresponding line 24(2) to further process the call (i.e., in accordance with ordinary voice mail handling procedures).

Alternatively, instead of rerouting the call to the voice mail system 28, the database 13 can contain some other applications software that, when executed by the central computer 14, causes the switch matrix 10 to route the call to some other line 24 (i.e., call forwarding) after the predetermined number of rings have occurred. The call can then be answered at a telephone 26 attached to the forwarded-to line 24, or, if again no answer is received, the call can be again rerouted either to the voice mail system 28 or to yet another line 24 (i.e., multiple or chaining diversions).

While the call is ongoing, the calling line record 50 maintains a pointer to the call monitor block 34 indicating that the trunk connection 20 of the calling station 30 is associated with the particular call that is being handled by the call monitor block 50. In addition, the call record 44 maintains a pointer to the calling line block 40. These pointers form a two-way link 52 between the call monitor block 34 and the calling line block 40. Similarly, the call record 44 and the line record 46 or 48 for the line to which the call is currently routed maintain a two-way link 54 or 54' between the call monitor block 34 and the line block 36 or 38 for the line to which the call is currently routed. The two-way link 54 of FIG. 2, for example, illustrates the situation in which the call has already been diverted to the voice mail system 28. Thus, the two-way link 54 involves the line record 48 and line block 38 that are associated with the voice mail system 28. Ordinarily, once the call is diverted to another line 24 in this manner, there is no way for the originally called user telephone 26 to answer the call because the two-way link 54' between the called line block 36 and the call monitor block 34 is released when the call is diverted.

In accordance with the present invention, however, a pointer to the call monitor block 34 is stored in the line record 46 for the called party 26 when the call is diverted to the voice mail line 24(2) or to some other line 24(3). This pointer forms a oneway link 56 from the called line block 36 to the call monitor block 34. When a user wants to retrieve a call that has been diverted (e.g., because the user narrowly missed the call), the user activates a special retrieve feature by, for example, pressing a preprogrammed key or dialing a feature code. Upon activation of this feature, the called line block 36 uses the pointer to the call monitor block 34 to request a re-connection of the call with the originally called user telephone 26. This re-connection request can be performed, for example, by sending a request message within the central computer 14.

Upon receiving the request message, the call monitor block 34 checks to see whether the call is still available by determining, for instance, if the call monitor block 34 is still processing the call. If the call is not available (i.e., if the caller has already hung up), a negative response message is sent by the call monitor block 34 to the called line block 36. The called line block 36 can in turn cause a tone to be played and/or a message to be displayed on the user telephone 26 indicating that the call is unavailable. In the case where the call has been forwarded to another telephone 26' and the call has been answered at that telephone 26', the call monitor block 34 will typically indicate that the call is no longer available instead of allowing the call to be retrieved, which would cause the ongoing communication with the forwarded-to telephone user 26' to be abruptly interrupted.

On the other hand, if the call monitor block 34 determines that the call is available, the call monitor block 34 directs the switching matrix 10 to route the call, once again, to the originally called user telephone 26. The switching matrix 10 then establishes the necessary voice paths from the incoming trunk connection 20 to the called user line 24(1). The voice path to the voice mail system 28 is released, and the central computer 14 sends a message instructing the voice mail system 28 to delete from the voice mailbox the message, if any, that the caller may have started. In addition, a new two-way link 54' between the call monitor block 34 and the called line block 36 is established, and the two-way link 54 between the call monitor block 34 and the voice mail line block 38 is dropped. Retrieval of a diverted call in this manner can also be accomplished when the call has been diverted to another telephone and when the call has been diverted more than once (e.g., to a mobile station associated with the called party and then to voice mail). In any event, once the necessary voice paths to the user telephone 26 are established, the central computer 14, through the called line block 36 and/or the call monitor block 34, can send a short tone burst to the user telephone 26 informing the user when to begin speaking.

The system can also include the capability of identifying, at the initially called telephone 26, the caller whose call was narrowly missed. For example, when the user initiates the call retrieval procedure by pressing a preprogrammed key or entering a feature code, the call monitor block 34 determines whether an identification of the caller is available. If so, the identification information is displayed at the user telephone 26. Otherwise, a message indicating that the identification information is not available is displayed at the user telephone 26. The user can then press a key or dial a code requesting a connection with the call or the connection can be automatically requested after a predetermined amount of time.

Figure 3:
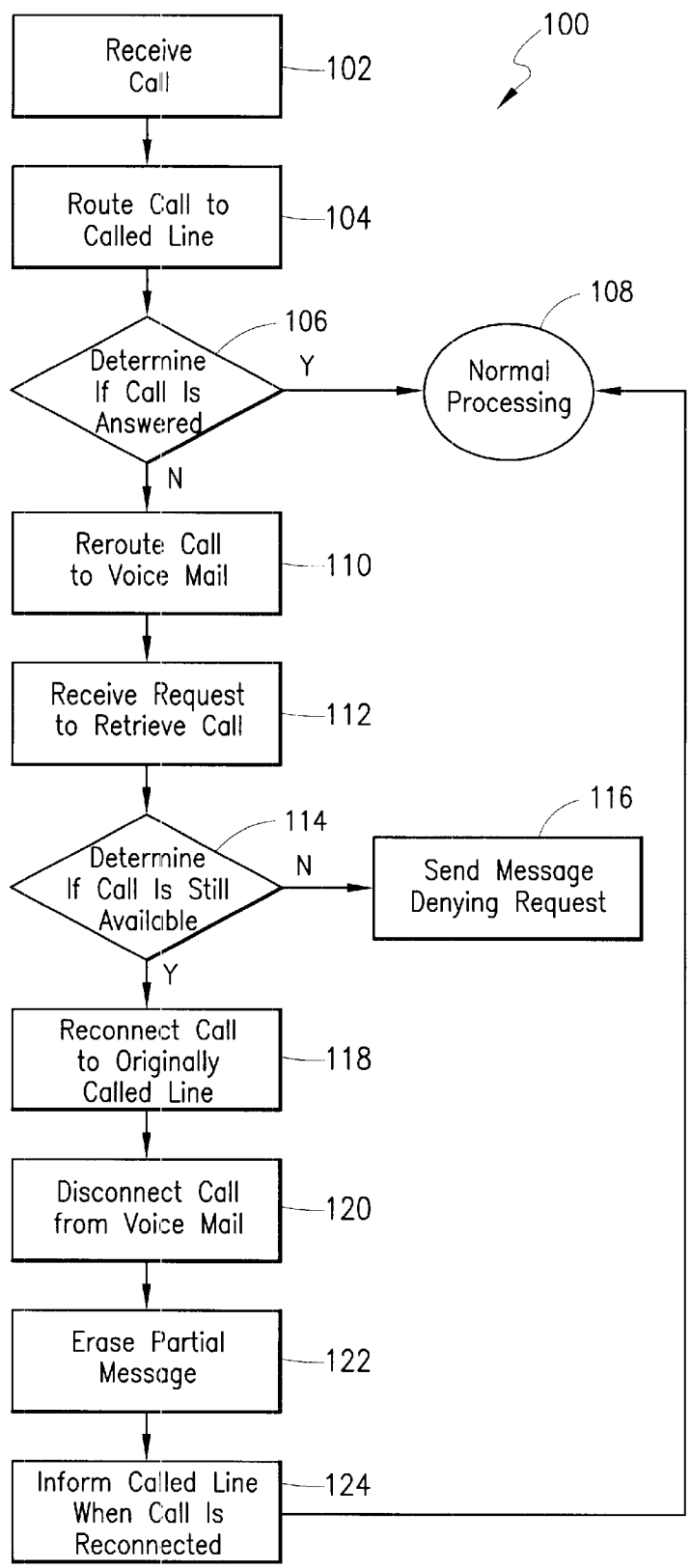
FIG. 3 is a flow diagram of a method, in accordance with the present invention, for retrieving calls that have been forwarded to voice mail.

Referring now to FIG. 3, there is illustrated a flow diagram of a method 100, in accordance with the present invention, for retrieving calls that have been forwarded to voice mail. First, an incoming call directed toward a particular user station 26 is received at an exchange 8 at step 102 and is routed to the user station 26 at step 104. The user station 26 is then monitored to determine at step 106 if the call is answered within a predetermined number of rings or within a predetermined time period. If the call is answered, then the call is handled according to normal call processing procedures at step 108. If the call is not answered within the prescribed time, however, then the call is rerouted to voice mail at step 110, and the original call routing connection is released. Thus, once the call has been rerouted, a user of the called station 26 is not able to answer the call by merely lifting the telephone receiver. Instead, the user must request that the call be retrieved from the voice mail system 28.

As a result, a request to retrieve the call is received from the originally called user station 26 at step 112, and it is determined whether the call is still available at step 114. If the call is not available, then a message is sent to the user station 26 at step 116 denying the request to retrieve the call and/or informing the user that the call is no longer available. If, on the other hand, the call is still available because, for example, the caller is in the process of leaving a message, then the call is reconnected to the originally called user station 26 at step 118. The call is also disconnected from voice mail at step 120, and any partial message left by the caller is erased at step 122. Once the re-connection of the call at step 118 is complete, the user station 26 is informed that the call has been successfully reconnected at step 124, and the call is handled according to normal call processing procedures at step 108. Although steps 118–124 are illustrated and described in the order of reconnecting the call to the user station, disconnecting the call from voice mail, erasing any partial messages from the voice mail, and informing the user station when the call is reconnected, it will be appreciated by those skilled in the art that some of these steps can be omitted or that these steps can occur in a different order or can occur simultaneously.

Although preferred embodiments of the system, method, and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for retrieving an incoming call that has been diverted from an original destination to another destination, said method comprising the steps of:

routing said incoming call, directed toward a particular user station, to said particular user station;

rerouting said incoming call from said particular user station to a voice mail system if the incoming call has not been answered prior to occurrence of a preselected triggering condition;

receiving, after said occurrence of said preselected triggering condition, a retrieval request to retrieve said rerouted incoming call for connection with said particular user station;

erasing a message recorded on said voice mail system; and connecting said incoming call with said particular user station in response to said retrieval request subsequent to said erasing a message.

2. The method of claim 1, further comprising the step of:

detecting whether said incoming call is answered at said user station prior to the occurrence of the preselected triggering condition.

3. The method of claim 2, wherein the preselected triggering condition comprises a predetermined number of rings.

4. The method of claim 2, wherein the preselected triggering condition comprises a predetermined amount of time.

5. The method of claim 1, wherein the step of rerouting the call further comprises the step of:

establishing a voice path connection to the voice mail system.

6. The method of claim 5, further comprising the step of:

releasing the voice path connection in response to the retrieval request.

7. The method of claim 1, wherein the step of connecting said incoming call with said particular user station further comprises the step of:

establishing a voice path connection to said particular user station.

8. The method of claim 1, further comprising the step of notifying said particular user station after said step of connecting said incoming call with said particular user station.

9. A telecommunications system for retrieving an incoming call that has been diverted from an original destination to another destination, comprising:

an originating line carrying said incoming call;

a destination telephone toward which said incoming call is directed;

a destination line connected to the destination telephone and operably connected to said originating line; and a local exchange connected to the originating line and to the destination line, said local exchange including:

a switching matrix;

a telephone line interface for connecting the switching matrix with a plurality of telephone lines; and a central computer for controlling the switching matrix and for controlling operations of the local exchange, said central computer comprising:

a call monitor block for handling said incoming call directed toward said destination telephone, said call monitor block directing the switching matrix to route said incoming call to one of said plurality of telephone lines associated with the destination telephone, directing the switching matrix to reroute the incoming call to a different destination if the incoming call has not been answered prior to the occurrence of a preselected triggering condition; and a called line block for handling said destination line connected to the destination telephone, said called line block receiving a retrieve call request from the destination telephone to retrieve the rerouted incoming call, and sending a message, in response to the retrieve call request, to the call monitor block requesting a connection between the incoming call and the destination telephone, said call monitor block, in response to said message, directing the switching matrix to route the incoming to the destination line connected to the destination telephone.

10. The telecommunications system of claim 9, wherein the originating line comprises a trunk connection between the local exchange and a remote exchange.

11. The telecommunications system of claim 9, wherein the originating line comprises a telephone line connected to an originating telephone associated with the local exchange.

12. The telecommunications system of claim 9, wherein the destination telephone is associated with the local exchange.

13. The telecommunications system of claim 9, wherein the preselected triggering condition comprises a predetermined number of rings.

14. The telecommunications system of claim 9, wherein the preselected triggering condition comprises a predetermined amount of time.

15. The telecommunications system of claim 9, wherein the local exchange further operates to establish a connection with the different destination in response to the rerouting of the incoming call.

16. The telecommunications system of claim 15, wherein the local exchange further operates to release the connection with the different destination in response to the request to retrieve the rerouted call.

17. The telecommunications system of claim 16, wherein the different destination comprises a voice mail system.

18. The telecommunications system of claim 17, wherein the local exchange further operates to direct the voice mail system to erase a message recorded before the incoming call is connected with the destination telephone.

19. The telecommunications system of claim 16, wherein the different destination comprises a user telephone associated with the local exchange.

20. The telecommunications system of claim 9, wherein the destination telephone includes a preprogrammed key for transmitting to the local exchange the request to retrieve the rerouted call.

21. A telecommunications exchange, comprising:

a switching matrix;

a telephone line interface for connecting the switching matrix with a plurality of telephone lines; and a central computer for controlling the switching matrix and for controlling operations of the telecommunications exchange, said central computer comprising:

a call monitor block for handling an incoming call directed toward a particular user station, said call monitor block directing the switching matrix to route the incoming call to one of said plurality of telephone lines associated with the user station, detecting whether the incoming call is answered at the user station prior to a preselected triggering event, and directing the switching matrix to reroute the incoming call to a different destination in response to said preselected triggering event; and a called line block for handling the telephone line associated with the user station, said called line block receiving a retrieve call request from the user station to retrieve the rerouted call, and sending a message, in response to the retrieve call request, to the call monitor block requesting a connection between the incoming call and the user station, said call monitor block, in response to said message, directing the switching matrix to route the incoming call to the telephone line associated with the user station.

22. The telecommunications exchange of claim 21, wherein the incoming call is received from one of the plurality of telephone lines.

23. The telecommunications exchange of claim 21, further comprising a trunk connection interface for connecting the switching matrix with at least one trunk connection.

24. The telecommunications exchange of claim 21, wherein the incoming call is received from said at least one trunk connection.

25. The telecommunications exchange of claim 21, wherein the preselected triggering event comprises the execution of a predetermined number of rings.

26. The telecommunications exchange of claim 21, wherein the preselected triggering event comprises the elapse of a predetermined amount of time.

27. The telecommunications exchange of claim 21, wherein the different destination comprises a voice mail system.

28. The telecommunications exchange of claim 27, wherein the call monitor block further directs the voice mail system to erase a message recorded by said voice mail system.

29. The telecommunications exchange of claim 21, wherein the different destination comprises a device connected to one of said plurality of telephone lines.

30. The telecommunications exchange of claim 21, wherein the different destination comprises a subscriber station.

31. The telecommunications exchange of claim 21, wherein the called line block includes a line record for storing a pointer to said call monitor block.

32. The telecommunications exchange of claim 21, wherein the called line block uses the stored pointer to send the message to the call monitor block.

33. A telecommunications system for retrieving an incoming call that has been diverted from an original destination to another destination, comprising:

an originating line carrying said incoming call;

a destination telephone toward which said incoming call is directed;

a destination line connected to the destination telephone and operably connected to said originating line; and a local exchange connected to the originating line and to the destination line, said local exchange routing said incoming call to the destination line, rerouting the incoming call to a voice mail system if the incoming call has not been answered prior to the occurrence of a preselected triggering condition, and, in response to a request to retrieve the rerouted incoming call for connection with the destination telephone, connecting the incoming call with the destination telephone and erasing a message recorded on the voice mail system.

34. The telecommunications system of claim 33, wherein the originating line comprises a trunk connection between the local exchange and a remote exchange.

35. The telecommunications system of claim 33, wherein the originating line comprises a telephone line connected to an originating telephone associated with the local exchange.

36. The telecommunications system of claim 33, wherein the destination telephone is associated with the local exchange.

37. The telecommunications system of claim 33, wherein the preselected triggering condition comprises a predetermined number of rings.

38. The telecommunications system of claim 33, wherein the preselected triggering condition comprises a predetermined amount of time.

39. The telecommunications system of claim 33, wherein the local exchange further operates to establish a connection with the voice mail system in response to the rerouting of the incoming call.

40. The telecommunications system of claim 39, wherein the local exchange further operates to release the connection with the voice mail system in response to the request to retrieve the rerouted call.

41. The telecommunications system of claim 33, wherein the destination telephone includes a preprogrammed key for transmitting to the local exchange the request to retrieve the rerouted call.

* * * * *